United States Patent [19]

Martin-Lopez

[11] Patent Number: 4,928,054
[45] Date of Patent: May 22, 1990

[54] SWITCH MODE ELECTRICAL POWER CONTROLLER

[75] Inventor: Fernando Martin-Lopez, Santa Clara County, Calif.

[73] Assignee: Seagate Technology, Inc., Scotts Valley, Calif.

[21] Appl. No.: 246,764

[22] Filed: Sep. 20, 1988

Related U.S. Application Data

[63] Continuation-in-part of Ser. No. 179,165, Apr. 8, 1988, abandoned.

[51] Int. Cl.[5] .............................................. G05F 1/56
[52] U.S. Cl. .................................... 323/288; 323/242; 323/326
[58] Field of Search ................ 323/242, 243, 282–284, 323/288, 326; 363/162

[56] References Cited

U.S. PATENT DOCUMENTS 4,276,586  6/1981  Boekhorst ....................... 323/288 X
4,325,021  4/1982  McMackin ....................... 323/288 X
4,578,630  3/1986  Grosch ............................ 323/282 X

FOREIGN PATENT DOCUMENTS 1546453  5/1979  United Kingdom .

Primary Examiner—Patrick R. Salce
Assistant Examiner—Emanual Todd Voeltz
Attorney, Agent, or Firm—Flehr, Hohbach, Test, Albritton & Herbert

[57] ABSTRACT

A switch mode electrical power controller arranged to provide a width modulated output pulse signal in response to a control input signal representing a parameter controlled by the power controller, in which a signal processing network for generating the width modulated waveform is arranged to execute all its operations in parallel. The performance, in parallel, of the operations required for the generation of the output signal minimizes the delay along a critical signal path and facilitates high frequency operation.

7 Claims, 6 Drawing Sheets

SWITCH MODE ELECTRICAL POWER CONTROLLER

This patent application is a continuation-in-part of U.S. Patent Application Ser. No. 179,165, filed April 8, 1988 now abandoned. The present invention relates to a switch mode electrical power controller.

Switch mode electrical power controllers are used in electrical power supplies. An electrical power supply for an electrical system including active semiconductor or vacuum devices is usually required to provide a substantially constant output voltage from a rectified alternating voltage while an electrical power supply for an electrical motor may be required to provide a variable output voltage for the control of the motor speed. Thus, the controller for an electrical power supply may be required to provide for either the generation of a stabilized output voltage or a variable output voltage from an unstabilized input voltage.

An electrical power supply employing a switch mode controller operates by chopping the input voltage, passing to its output port either the full input voltage or zero voltage. The periods with a non-zero output voltage alternate with those of zero output voltage and the ratio of the two periods is varied as required to make the long term average voltage equal to the desired output voltage.

One of the advantages of a switch mode electrical power supply over other forms of electrical power supply is that the operating frequency may, within limits, be selected, and the fact that the energy storage components become smaller as the operating frequency is increased permits some control over the size of the power supply.

An object of the present invention is the provision of a switch mode electrical power controller capable of operation at higher frequencies than existing switch mode electrical power controllers.

In accordance with the present invention, a switch mode electrical power controller includes a generator arranged to provide an output signal having a repetitively occurring ramp waveform, a control input port for receiving a control signal which, in operation, is representative of the required output voltage from a power supply to which the controller belongs, and a signal processing network arranged to provide, from the ramp waveform and the control signal, a repetitive output signal having a first level for a first period and a second level for a second period which adjoins the first period, the signal processing network being arranged to perform, in parallel, the operations required for the generation of the output signal in which the ratio of the first period to the second period varies with the level of the control signal.

The performance, in parallel, of the operations required for the generation of the output signal minimizes the delay along a critical signal path and facilitates high frequency operation.

In a preferred embodiment of the present invention, the signal processing network includes a comparator having first and second input ports, the first input port of the comparator being connected to receive the output signal from the generator and the second input port of the comparator being connected to the control input port of the controller means connected within the comparator to cause regenerative switching of the comparator to provide the output signal changes between the first and the second levels, and means connected within the comparator to reset the comparator to provide an output signal at the first level at the beginning of each ramp waveform.

In a first embodiment of the present invention, the signal processing network includes a comparator having first and second input ports, the first input port of the comparator being connected to receive the output signal from the generator and the second input port of the comparator being connected to the control input port of the controller, a feedback network in the comparator arranged to cause regenerative switching of the comparator between first and second states which provide respective first and second output levels, and a feedforward network connected between the input and output regions of the comparator arranged to set the comparator to its first state at the beginning of each ramp waveform.

In the first embodiment of the present invention, the feedback network may be arranged to include output regions of the comparator.

In an alternative to the first embodiment of the present invention, the signal processing network includes a comparator having first and second input ports, the first input port of the comparator being connected to receive the output signal from the generator and the second input port of the comparator being connected to the control input port of the controller, an output stage connected directly to the comparator output port, a feedback network connected to the comparator and the output stage arranged to cause the output stage to switch regeneratively between the first and second output levels, and a feedforward network connected between the input and the output regions of the comparator arranged to set the comparator to its first state at the beginning of each ramp waveform.

In an alternative embodiment, the feedback network may be arranged to include input regions of the output stage.

In an embodiment of the present invention, the signal processing network may include similar first and second channels, arranged to provide alternatively on respective output ports, repetitive output signals having a first level for a first period and a second level for a second period which adjoins the first period.

In an embodiment of the present invention, the signal processing network may include commutation and blanking networks arranged to operate in parallel with the remainder of the signal processing network.

In an embodiment of the present invention and second channels combined to provide, serially on a single output port, repetitive output signals having a first level for a first period and a second level for a second period which adjoins the first period.

In an embodiment of the present invention, the signal processing network may include a commutation network arranged to operate in parallel with the remainder of the signal processing network.

In an embodiment of the present invention, the generator may be a non-saturating emitter coupled multivibrator providing first and second output waveforms comprising alternate ramp and constant portions, the first and second waveforms being similar but with a half-period time displacement between them.

In an embodiment of the present invention, the signal processing network may include current and voltage limit protection networks arranged to operate in parallel with the remainder of the signal processing network.

In an embodiment of the present invention, the signal processing network may be arranged as differentially-connected transistor networks with common-mode and differential-mode input ports and with corresponding output ports of the networks connected in parallel. A switch mode electrical power controller in accordance with the present invention will now be described by way of example only and with reference to the accompanying drawings, in which.

Figure 1:
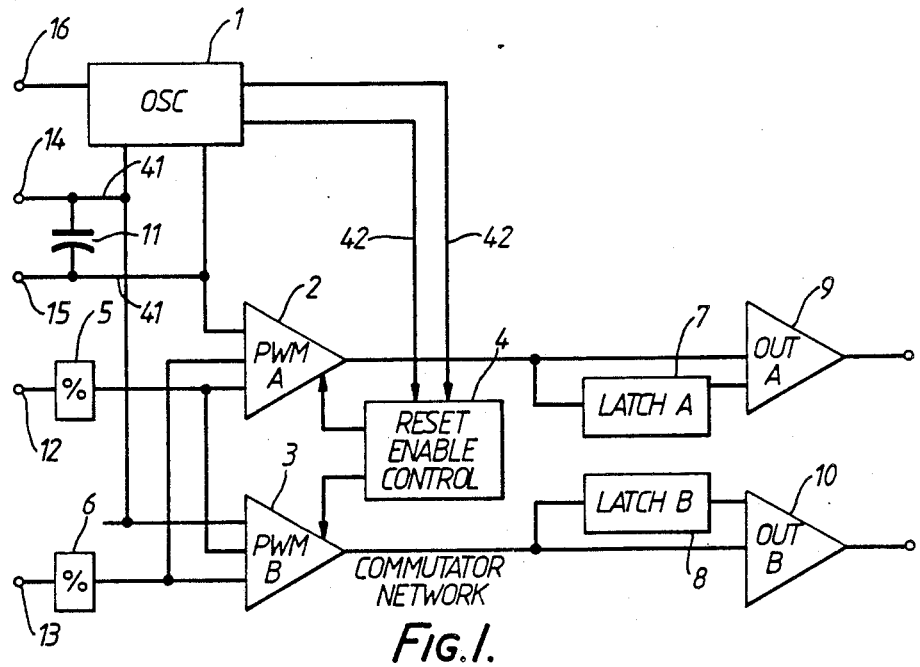
FIG. 1 is a block diagram representation of a first form of switch mode electrical power controller, in accordance with the present invention, including a ramp waveform generator, a signal processing network with two channels, and an output stage connected to each channel of the signal processing network.
Figure 8:
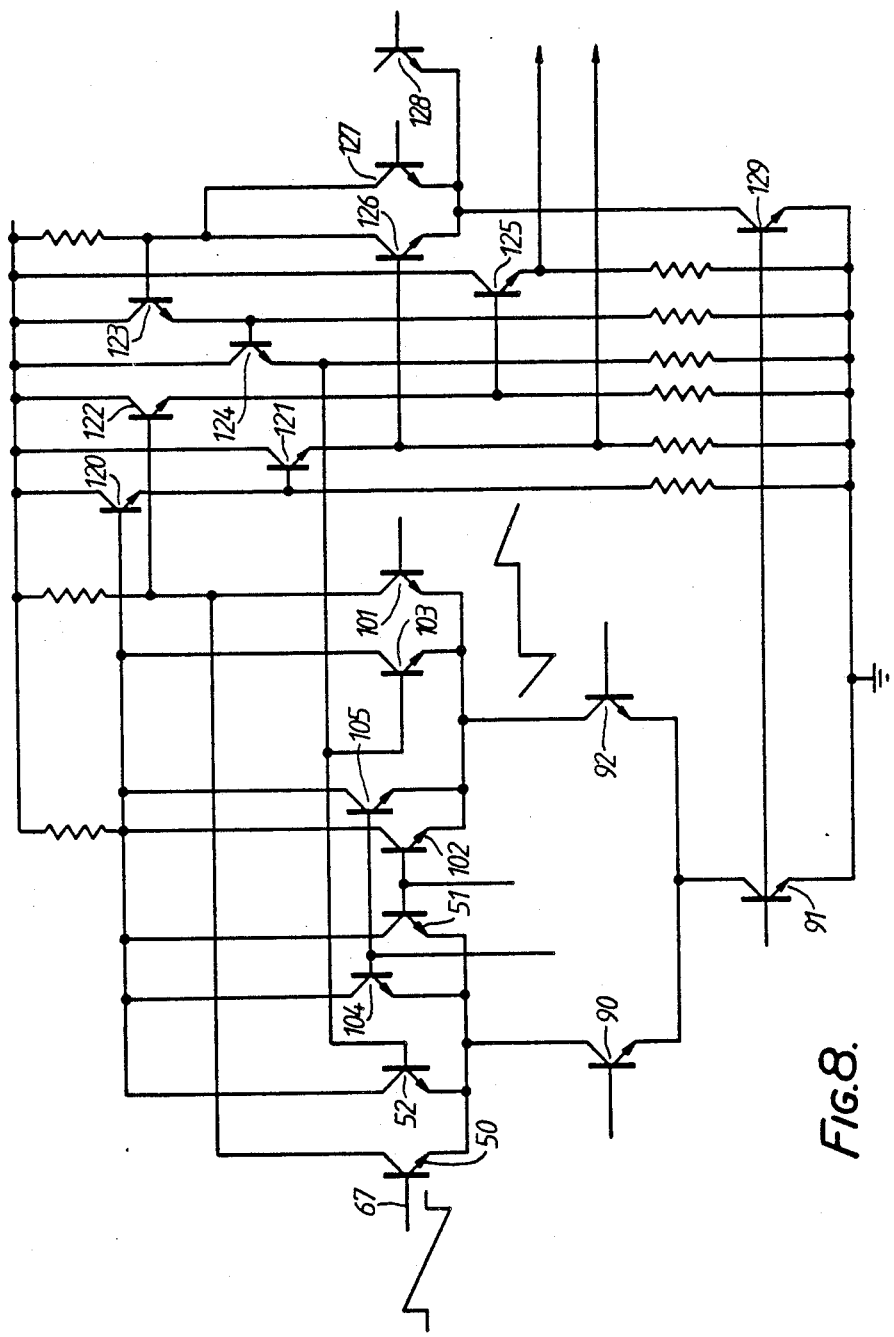
Figure 9:
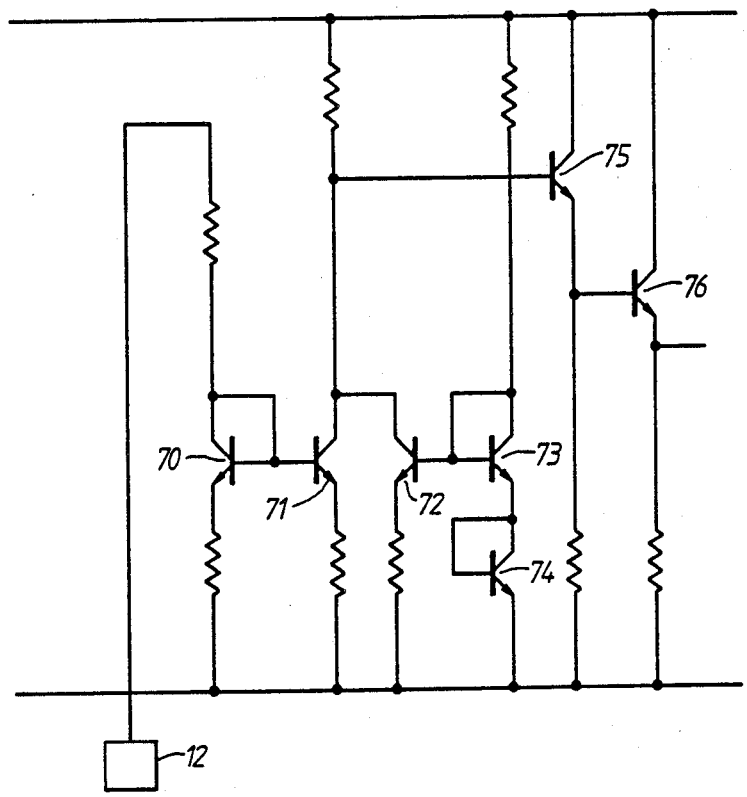

FIG. 8 is a circuit diagram representation of an arrangement of the signal processing network for providing a single-ended output from the controller; and FIG. 9 is a circuit diagram representation of a signal level setting network included in both the first and second forms of the power controller. Referring to FIG. 1, the first form of the switch mode electrical power controller includes a ramp generating oscillator 1, two pulse-width modulators 2 and 3, a control network 4, signal level setting networks 5 and 6, two latching networks 7 and 8, and two output stages 9 and 10, and an external capacitor. The capacitor 11 is required for the oscillator 1.

Referring to FIG. 1, the oscillator 1 has output ports connected to input ports of the pulse-width modulators 2 and 3, and a further output port connected to the control network 4. The control network 4 has output ports connected to the pulse-width modulators 2 and 3. The pulse-width modulator 2 has an output port connected directly to the output stage 9 and the latching network 7 is connected internally to the output stage 9 and to the output port of the pulse-width modulator 2. The pulsewidth modulator 3, the output stage 10, and the latching network 8 are connected together in the same manner as the pulse-width modulator 2, the output stage 9, and the latching network 7, are connected together. The signal level setting network 5 is connected between a control input port 12 and an input port of the pulse-width modulator 2 and is connected also to an input port of the pulse-width modulator 3. The signal level setting network 6 is connected between a control input port 13 and the pulse-width modulators 2 and 3 in a manner similar to the connection of the level setting network 5 to the pulse width modulators 2 and 3.

Figure 2:
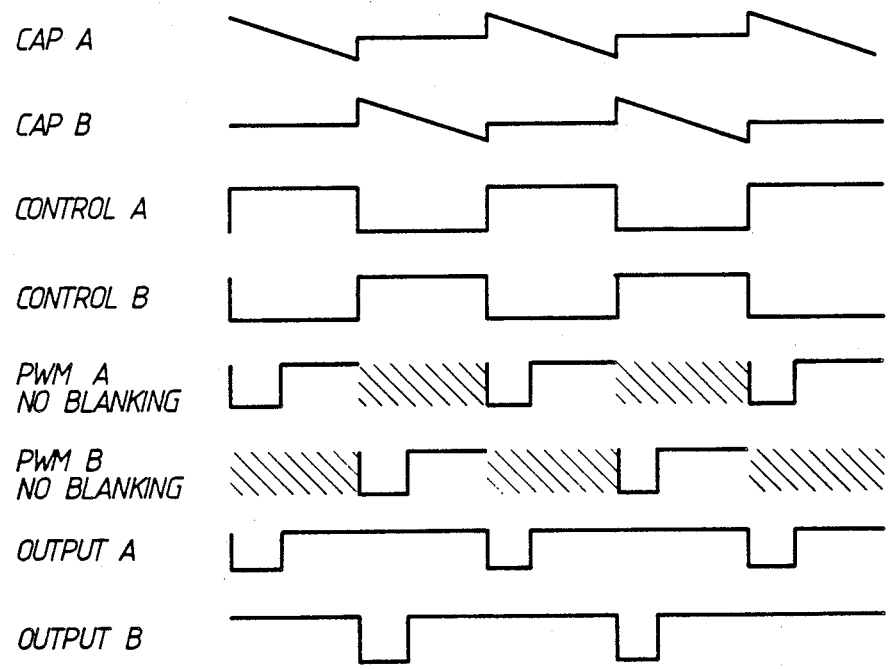
FIG. 2 is a diagrammatic representation of the waveforms provided by the ramp waveform generator, the signal processing network, and the output stages of the controller of FIG. 1.

The operation of the switch mode power controller of FIG. 1 may be understood by referring to FIG. 2 in which the waveforms labeled CAP A and CAP B represent the signals provided by the oscillator 1 at the input ports to the pulse-width modulators 2 and 3, the waveforms labeled CONTROL A and CONTROL B represent the signals provided by the control network 4 to the pulse-width modulators 2 and 3, the waveforms labeled PWMA and PWMB represent the output signals from the pulse-width modulators 2 and 3, and the waveforms labeled OUTPUT A and OUTPUT B represent the signals from the output stages 9 and 10.

Referring to FIG. 2, the waveform CAP A includes alternate falling ramp portions and constant level portions and the waveform CAP B has the same form as the waveform CAP A but is shifted from it in time byu a halfperiod of either waveform. The waveform PWMA is shown as having half-periods corresponding to the ramp portions of the waveform CAP A but is initially at a low level and changes abruptly to a high level during the existence of the ramp portion of the waveform CAP A. The change in the level of the waveform PWMA will occur at the time when the input signal on one of the control input ports 12 and 13 is such that the signal at a second of the input ports of the pulse-width modulator 2 is equal to the ramp level, the waveform PWMA being low while the ramp level is the greater and the waveform being high while the ramp level is the lower, of the two signals. It will be appreciated that the ratio of the period for which the waveform PWMA is low to that when it is high will alter as the input signal on the port 12 or 13 varies. The level setting networks 5 and 6 are required to adjust the range of the signal appearing at the input ports of the pulse-width modulators 2 and 3 to match the amplitude of the ramp. The waveform PWMB is generated in a similar manner to that of PWMA. It will be noted that PWMA and PWMB are not shown for the period during which the waveforms CAP A and CAP B are constant for the reason that PWMA and PWMB are meaningful only during periods when CAP A and CAP B are ramp waveforms. The waveforms CONTROL A and CONTROL B are used to set the pulse-width modulators 2 and 3 to their respective high output level states, that is, to effect blanking during those periods when CAP A and CAP B are not ramp waveforms to provide the output waveforms OUTPUT A and OUTPUT B.

The output waveforms OUTPUT A and OUTPUT B may be combined to provide a single-ended output device or the waveforms OUTPUT A and OUTPUT B may be kept separate to provide a double-ended output device.

Figure 3:
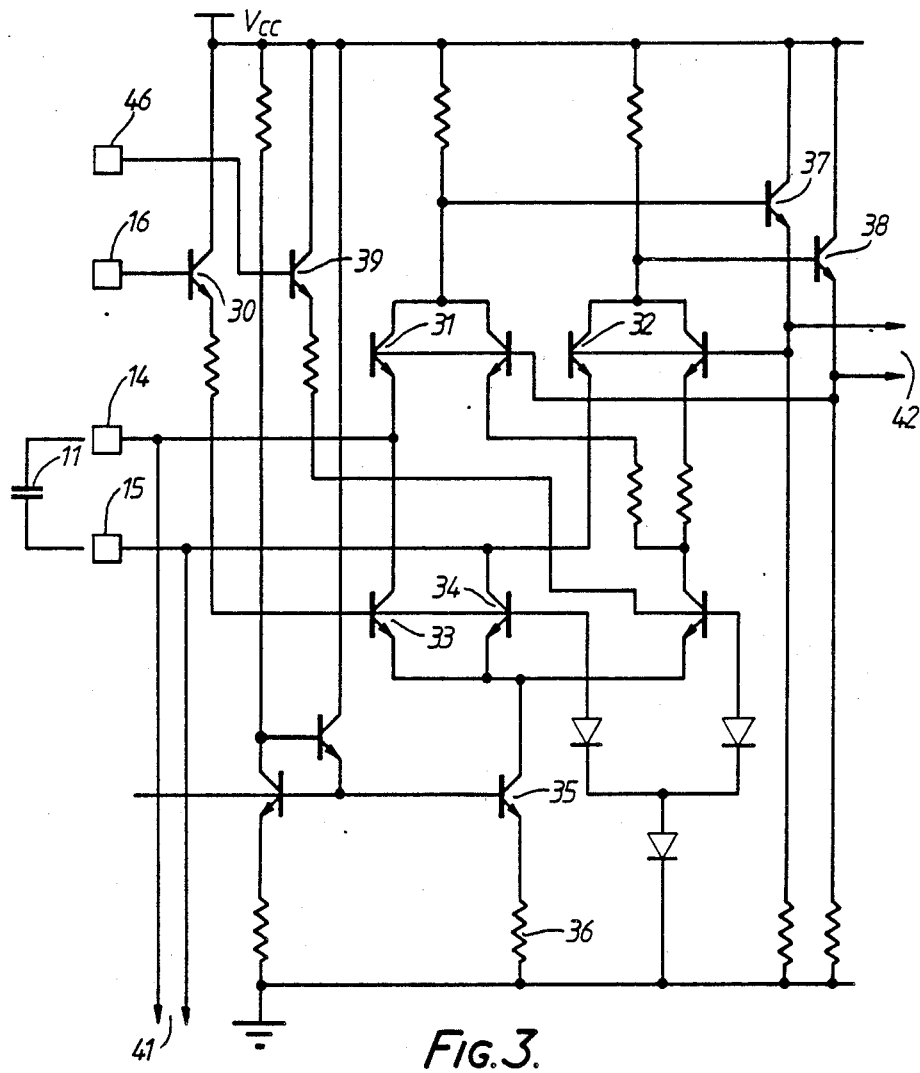
FIG. 3 is a circuit diagram representation of the ramp waveform generator of FIG. 1.

FIG. 3 is a circuit diagram representation of the oscillator of FIG. 1 and, referring to FIG. 3, the oscillator includes ports 14 and 15 between which are connected the frequency-determining capacitor (the capacitor 11 of FIG. 1). The oscillator is an integrated circuit form of a symmetrical non-saturating emitter coupled multivibrator in which the frequency-determining capacitor 11 is connected between the emitters of two transistors supplied by current sources and in which there are feedback connections between the transistors to cause oscillation, the two current source currents flowing first one way through the capacitor and then the other way through the capacitor to generate the ramp waveforms as the transistors switch alternately on and off (see Electronic Designer's Handbook by T. K. Hemingway, pages 191 to 194)). In FIG. 3, the capacitor 11 is connected to the emitters of the transistors 31 and 32 for which the transistors 33, 34 and 35 and the resistor 36 provide two current sources. The signals developed at the collector electrode of the transistor 31 are fed back to the base electrode of the transistor 32 by way of the transistor 37 and the signals at the collector electrode of the transistor 32 are fed back to the base electrode of the transistor 31, to provide cross-coupling between the output and input ports. The emitter electrode of the transistors 37 and 38 provide further output ports for the oscillator.

Figure 4:
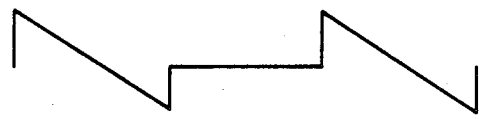
FIG. 4 is a diagrammatic representation of the ramp waveforms provided by the ramp waveform generator of FIG. 3.
Figure 4:

Referring to FIG. 4, waveforms of the output signals available from the port 14 of the oscillator is shown as the upper waveform, say, of FIG. 4, and the waveform of the output signal available from the port 15 of the oscillator is then the lower waveform of FIG. 4. As is evident from the two waveforms, the oscillator provides a signal in which a negative-going ramp alternates with a constant level about which the ramps are symmetrical. The waveforms of FIG. 4 are, of course, the same as the upper waveforms of FIG. 2. The oscillator includes a frequency-control input port 16 permitting control of the current source currents, and thereby the operating frequency, by way of a transistor 30.

Figure 5:
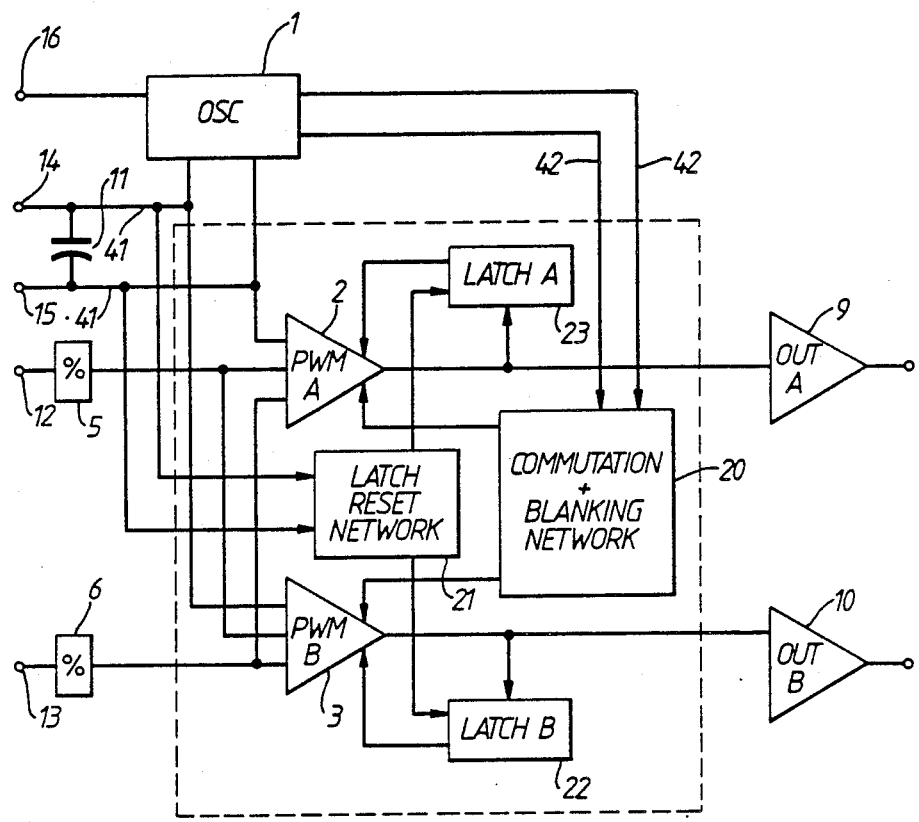
FIG. 5 is a block diagram representation of a second form of switch mode electrical power controller, in accordance with the present invention, in which the signal processing network and the output stages are arranged differently from the signal processing network and output stages of FIG. 1.

Referring to FIG. 5, the second form of the switch mode electrical controller includes, as for the first form represented by FIG. 1, a ramp generating oscillator 1, two pulse-width modulators 2 and 3, signal level setting networks 5 and 6, two output stages 9 and 10, and an external capacitor 11 is required for the oscillator 1. The second form of the controller includes, connected to the oscillator 1 and the pulse-width modulators 2 and 3, a commutation and blanking network 20, two latching networks 22 and 23, and a latch reset network 21.

Referring to FIG. 5, the oscillator 1 has output ports connected to input ports of the pulse-width modulators 2 and 3, and a further output port connected to the commutation and blanking network 20. The commutation and blanking network 20 has output ports connected to the pulse-width modulators 2 and 3. The pulse-width modulator 2 has an output port connected directly to the output stage 9 and the latching network 23 is connected internally to the pulse-width modulator 2 and also to the output port of the pulse-width modulator 2. The latch reset network 21 has input ports connected also to the output ports of the oscillator 1 and an output port of the latch reset network 21 is connected to an input port of the latching network 23. The pulse-width modulator 3 has an output port connected directly to the output stage 10 and the latching network 22 is connected internally to the pulse-width modulator 3 and also to the output port of the pulse-width modulator 3. The latch reset ne 21 has a further output port connected to an input port of the latching network 22. The signal level setting network 5 is connected between a control input port 12 and an input port of the pulse width modulator 2 and is connected also to an input port of the pulse width modulator 3. The signal level setting network 6 is connected between a control input port 13 and the pulse width modulators 2 and 3 in a manner similar to the connection of the level setting network 5 to the pulse-width modulators 2 and 3.

The operation of the second form of the switch mode power controller of FIG. 5 gives rise to the waveforms which are illustrated by FIG. 2, that is, the operation of the second form of the switch mode power controller is the same as that of the first form of the switch mode power controller.

Figure 6:
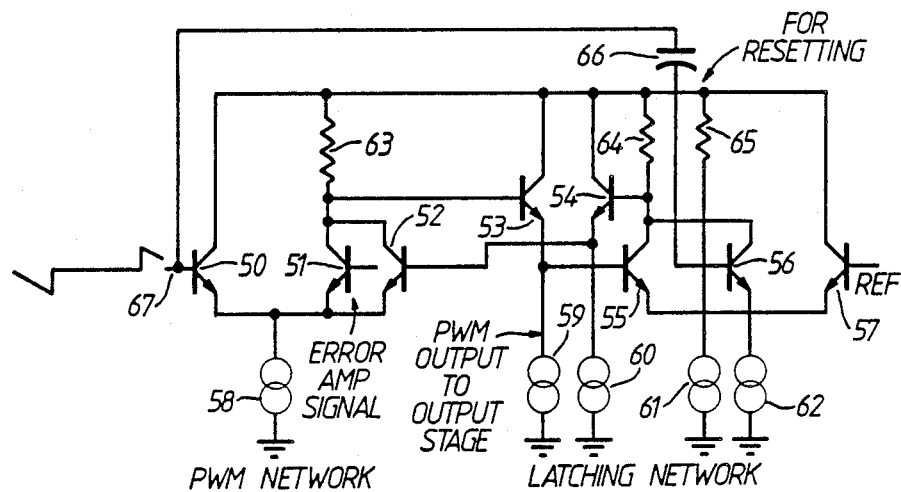
FIG. 6 is a circuit diagram representation of part of the signal processing network of FIG. 5 capable of carrying out the functions of pulse-width modulation and output signal switching, latching, and resetting.

Referring to FIG. 6, a signal processing network includes first and second transistors 50 and 51 coupled together at their emitter electrodes and sharing a current source 58 connected to the coupled emitters. A third transistor 52 is connected in parallel with the transistor 51 to share its collector load resistor 63 and the current source 58. The collector electrodes of the transistors 51 and 52 are connected to the base electrode of a fourth transistor 53 which has a current source 59 connected as its emitter load and the emitter electrode of the transistor 53 is connected to the base electrode of a transistor 55 which has a current source emitter load 62, and a collector load resistor 64. The collector electrode of the transistor 55 is connected to the base electrode of a transistor 54 which has a current source emitter load 60, the emitter electrode of the transistor 54 being connected to the base electrode of the transistor 52. A transistor 56 is connected in parallel with the transistor 55 sharing the collector load resistor 64 and the emitter current source 62. The transistor 56 is biased by means of a base resistor 64 connected between its base electrode and a positive voltage (which is the positive voltage supply for the other transistors) and a current source 61 connected between its base electrode and electrical ground. The base electrode of the transistor 56 is connected to the base electrode of the transistor 50 by way of a capacitor 66. A further transistor 57 has its emitter electrode connected to the current source 62, and its collector electrode connected to the positive supply for the other transistors. The base electrode of the transistor 57 is connected to a further resistor and a further current source similar to the connections of the base electrode of the transistor 56 to its resistor 65 and current source 61, but the further resistor and current source associated with the transistor 57 are not shown.

In the operation of the signal processing arrangement of FIG. 6, the base electrode of the transistor 50 receives a ramp waveform signal from the oscillator 1 of FIG. 1 while the base electrode of the transistor 51 receives a constant level signal which is an error voltage which will represent the difference between the desired and actual output voltages of a power supply to which the signal processing arrangement belongs. The ramp waveform has an initial rapid rise from the constant voltage level which precedes it and this jump in level is communicated, by way of the capacitor 66, to the base electrode of the transistor 56 causing an abrupt rise in its collector current and an abrupt drop in its collector voltage level, the collector voltage level drop being communicated to the base electrode of the transistor 52 by way of the transistor 5 to hold transistor 52 in a non-conducting state. Also, the ramp voltage level will start higher than the error voltage and transistor 51 will be held in its nonconducting state so that the collectors of the transistors 51 and 52 will be at a high voltage level and the output voltage from the emitter electrode of the transistor 53 will be high. The output voltage will remain high as the ramp level falls but remains above the error signal level, but as the ramp level goes below the error signal level the transistor 51 will begin to conduct and its collector voltage will drop. The drop in the collector voltage of the transistor 51 will be communicated to the transistors 53 and 55 as a voltage drop and to the transistors 54 and 52 as a voltage rise, causing a regenerative effect resulting in the rapid switch on of the transistor 52 and the latching of the feedback loop with the transistor 52 in its conducting state. In due course, the transistor 51 will become fully conductive and will remain so to the end of the ramp waveform at which time the ramp waveform changes abruptly to the constant level which may lie below the error voltage level and as a result of which the transistor 51 may not be switched off and may cause the output voltage to remain low after the end of the ramp waveform so that the output state of the arrangement of FIG. 6 is undefined during the period between the ramp waveforms. It is important that the output voltage from the signal processing arrangement should return to a high level at the end of the ramp waveform and this is ensured by the control of the current source 58 to switch off the transistor 51 at the end of the ramp waveform. Such control of the current source is illustrated by the FIG. 7 arrangement.

Figure 7:
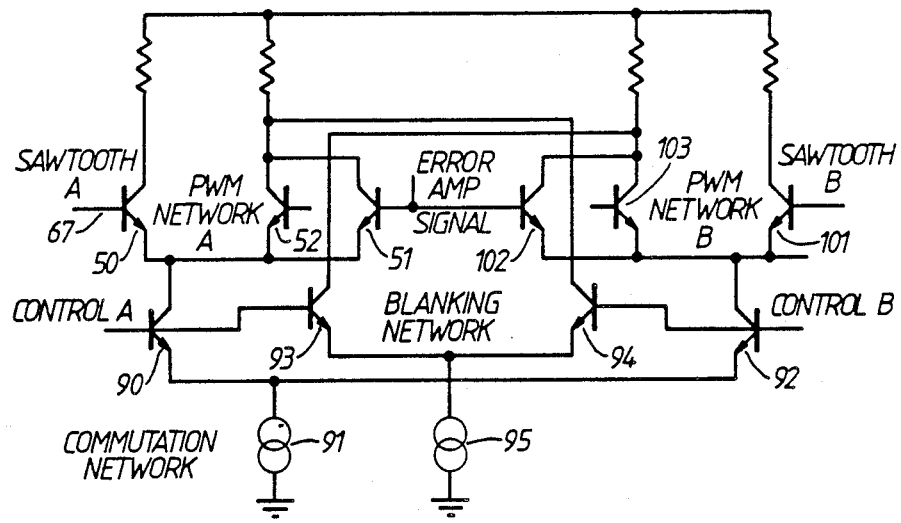
FIG. 7 is a circuit diagram representation of another part of the signal processing network of FIG. 5 capable of carrying out the circuit functions of commutation and blanking.

Referring to FIG. 7, a signal processing arrangement includes the "left-hand" transistors 50, 51, and 52 as described in FIG. 6 and corresponding "right-hand" transistors 101, 102, and 103 sharing a current source 91 connected in the emitter circuit of the transistors 50, 51, and 52 by way of a transistor 90 and connected in the emitter circuit of the transistors 101, 102, and 103 by way of a transistor 92. The base electrode of the transistor 90 is connected to the base electrode of a transistor 93, the emitter electrode of which is connected to a current source 95 and the base electrode of the transistor 92 is connected to the base electrode of a transistor 94, the emitter electrode of which is also connected to the current source 95. The collector electrode of the transistor 93 is connected to the collector electrode of the transistors 102 and 103, and the collector electrode of the transistor 94 is connected to the collector electrode of the transistors 51 and 52.

In the operation of the signal processing arrangement of FIG. 7, the base electrode of the transistor 90 is driven by the waveform CONTROL A of FIG. 2, and the base electrode of the transistor 92 is driven by the waveform CONTROL B of FIG. 2, the two waveforms being provided by the oscillator illustrated in FIG. 3 (the transistors 37 and 38 in FIG. 3 provide the waveforms CONTROL A and CONTROL B). It will be evident that the waveform CONTROL A will be such as to disable the stage comprising transistors 50, 51, and 52 by switching off transistor 90 during the periods when the CAP A waveform has a constant value, but the effect of the transistor 94 is superimposed on this and results in the collector voltage of the transistors 51 and 52 being held low, since the CONTROL B waveform controls the transistor 94. Similarly, the transistor 92 is driven by the CONTROL B waveform while the CONTROL A waveform drives the transistor 93, so the output signals from the left and right hand stages remain complementary and the stages operate alternately.

The signal processing arrangement of FIG. 7 provides a dual output that is an output for a double-ended controller. The signal processing arrangement of FIG. 7 may be converted to provide a single output by the removal of the components 93, 94 and 95, and the connection, in parallel, of the two channels.

A circuit diagram representation of the circuit arrangement of FIG. 7 modified to provide a single-ended output is shown in FIG. 8 where the stages comprising the transistors 120 to 127 corresponding generally to those parts of the signal processing network represented by FIG. 6, and the stages comprising the transistors 50, 51, 52, 104, 101, 102, 103, and 105 correspond to those parts of the signal processing network represented by FIG. 7. It is to be noted that the transistors 104 and 105 provide current limiting in this arrangement and perform their function in parallel with all the other functions.

Returning to FIG. 3, it will be noted that the oscillator frequency is controllable by way of the part 16, a practical effect of which is to permit the operation of a power supply equipped with a controller comprising the voltage controllable oscillator with a variable frequency. Such operation would be achieved by an arrangement in which an error voltage was applied to the port 16 as an alternative or in addition to an error voltage applied to the pulse-width control input port.

Referring to FIG. 9, a signal level setting network (either the network 5 or the network 6 of FIG. 1) includes a first NPN transistor 70 connected as a diode with associated collector and emitter electrode resistors, a second NPN transistor 71, connected base electrode to base electrode with the transistor 70, with its associated collector and emitter electrode resistors, a third NPN transistor 75, having its base electrode connected to the collector electrode of the transistor 71; with an associated emitter electrode resistor, and a fourth NPN transistor 76, having its base electrode connected to the emitter electrode of the transistor 75, with an associated emitter electrode resistor. A fifth NPN transistor 72 is connected collector electrode to collector electrode with the transistor 71, has an associated emitter electrode resistor, and is connected base electrode to base electrode with a sixth NPN transistor 73 which has its base and collector electrodes connected together. The transistor 73 has a collector electrode resistor and its emitter electrode is connected to a seventh NPN transistor 74 which has its base and collector electrodes connected together. The emitter electrode of the transistor 74 and the emitter electrode resistors of the transistors 70, 71, 72, 75, and 76 are connected together. Also, the collector electrode resistors of the transistors 71 and 73 are connected together and to the collector electrodes of the transistors 75 and 76. The collector electrode resistor of the transistor 70 is connected to the control input port 12, say, of FIG. 1.

In the operation of the level setting network of FIG. 9, an input control voltage to the port 12 produces a corresponding current in through the transistor 70 and its associated resistors, and the same amount of current flows through the transistor 71 and its associated emitter electrode resistor The current flowing through the transistor 71 influences the voltage level at the junction of its collector electrode through its collector electrode resistor, and the transistors 75 and 76, which act as a compound emitter follower, communicates the voltage level of the collector electrode of the transistor 71 to the emitter electrode of the transistor 76. The emitter electrode of the transistor 76 is the output port of the level setting network. The collector voltage of the transistor 71 is also influenced by the current flowing through the transistor 72, the current flowing through the transistor 72 being set by the transistors 73 and 74 and the resistor associated with the collector electrode of the transistor 73. The output voltage level from the signal level setting circuit is therefore the combined result of a fixed current flowing through the transistor 72 and a signal-dependent current flowing through the transistor 71. The maximum output voltage level will be set by the fixed current when the signal-dependent current is zero and the minimum output voltage level will be set by the collector and emitter electrode resistors of the transistor 71. The maximum output voltage level will be set by the fixed current when the signal-dependent current is zero and the minimum output voltage level will be set by the collector and emitter electrode resistors of the transistor 71, intermediate output voltage levels being in proportion to the signal applied to the control port 12 so long as the applied signal is below the value to cause the minimum output voltage levels. The arrangement of the active components in FIG. 9 is also temperature-compensated.

The level setting network of FIG. 9 provides level shifting for interfacing with the pulse width modulator 2 or 3 of FIG. 1. It also provides division by a factor of about 10 which is controlled by the ratio of the collector and emitter resistors of the transistor 70, and linearity and good control are achieved with a sawtooth excursion of about 1 Volt. An advantage of including the level setting network is that a large error amplifier output range may be used, giving good control through high sensitivity, while a match is maintained between the sawtooth waveform amplitude and the divided down error voltage.

What is claimed:

1. A switch mode power supply controller of the type that provides a repetitive output signal having a first state and a second state wherein the ratio of the first state of the output signal to the second state of the output signal varies in response to an error voltage signal representative of the difference between the actual output voltage of a power supply to which said controller belongs and a desired output voltage, said switch mode power supply controller comprising:
    means for generating an oscillator signal and a control signal derived from said oscillator signal, wherein said oscillator signal has a ramp portion and a second portion, said control signal having a first state corresponding to the ramp portion of said oscillator signal and a second state corresponding to said second portion of said oscillator signal,
    a pulse width modulating network comprising a comparator having a first and second input ports, wherein said first input port is connected to said oscillator signal and said second input port is connected to said error voltage signal, the output signal of said switch mode power supply changing states when the magnitude of the ramp portion of the oscillator signal is less than the magnitude of the error voltage signal,
    feedback means for latching said comparator at substantially the same time as a change in the output signal,
    means for blanking the comparator such that the output signal does not change states during the second portion of the oscillator signal.

2. A switch mode power supply controller as in claim 1 wherein change in the output signal and the latching of the comparator occur simultaneously.

3. A switch mode power supply controller as in claim 1 wherein said means for blanking the comparator is responsive to the control signal.

4. A switch mode power supply controller as in claim 1 further comprising a pulse width modulator having similar first and second channels to provide two output signals, wherein said first and second channels are commutated using said control signal without delay.

5. A switch mode power supply controller as in claim 1 wherein said means for generating an oscillator signal further comprises a non-saturating emitter coupled multivibrator.

6. A switch mode power supply controller as in claim 1 wherein said pulse width modulator network further comprises commutation networks.

7. A switch mode power supply controller of the type that provides two repetitive output signals each having a first state and a second state wherein the ratio of the first state of the output signal to the second state of the output signal varies in response to an error voltage signal representative of the difference between the actual output voltage of a power supply to which said controller belongs and a desired output voltage, said switch mode power supply controller comprising:
    a non-saturating emitter coupled multivibrator of the type that provides a first oscillator signal and a second oscillator signal wherein said oscillator signals each have a ramp portion and a second portion and are displaced in time by a half wavelength, a first control signal and a second control signal, said control signals being derived from said oscillator signals such that said control signals have a first state corresponding to the ramp portion of said oscillator signals and a second state corresponding to said second portion of said oscillator signals,
    a pulse width modulating network having two channels, each channel comprising a comparator having a first and second input ports, wherein said first input port is connected to one of said oscillator signals and said second input port being connected to said error voltage signal, the output signals of said switch mode power supply changing states when the magnitude of the ramp portions of the oscillator signals are less than the magnitude of the error voltage signal,
    feedback means associated with each of said channels for latching said comparators in a known state at substantially the same time as a change in the output signals, wherein the latching of said comparators occurs simultaneously with a change in the output signals,
    means responsive to said control signals for blanking said comparators such that the output signal does not change states during the second portions of the oscillator signals, and
    means for commutating without delay said first and second channels using said control signals.

* * * * *

UNITED STATES PATENT AND TRADEMARK OFFICE
CERTIFICATE OF CORRECTION

PATENT NO. : 4,928,054

DATED : May 22, 1990

INVENTOR(S) : LOPEZ

It is certified that error appears in the above-identified patent and that said Letters Patent is hereby corrected as shown below:

Title page, section [63], after "1988, abandoned.", insert --And GB Application 8708504, filed April 9, 1987.---

Signed and Sealed this

Fifteenth Day of February, 1994

*Attest:*

BRUCE LEHMAN

*Attesting Officer*     *Commissioner of Patents and Trademarks*